Dec. 30, 1969  J. W. TAYLOR  3,486,354
LOCKS AND KEYS

Filed Nov. 24, 1967  2 Sheets-Sheet 1

INVENTOR
Jack W. Taylor
BY
Edwin K. Greigg
ATTORNEY

Dec. 30, 1969   J. W. TAYLOR   3,486,354
LOCKS AND KEYS

Filed Nov. 24, 1967   2 Sheets-Sheet 2

INVENTOR
Jack W. Taylor
BY Edwin E. Greigg
ATTORNEY

United States Patent Office 3,486,354
Patented Dec. 30, 1969

3,486,354
LOCKS AND KEYS
Jack William Taylor, Bournemouth, England, assignor to Ingersoll Locks Limited, London, England, a British company
Filed Nov. 24, 1967, Ser. No. 685,407
Int. Cl. E05b 19/08
U.S. Cl. 70—393                                   7 Claims

ABSTRACT OF THE DISCLOSURE

The invention relates to a type of lock and key in which impediments to prevent unauthorised operation of the deadbolt or locking bolt are situated within the casing of the lock and are capable of operation to enable movement of the deadbolt or locking bolt from the outward and locked position to the inward and unlocked position by a key when the latter is inserted from either side in or through a key bolt in a barrel, curtain or deadbolt operating member and rotated, and the improvement consists in mounting the barrel or curtain in the lock casing to present a keyhole at each side of the casing, the keyhole being of such form to control the degree of entry of the key when inserted in the barrel from either side. The key having a casing bit formed with two sets of notches for alternative use according to the direction of insertion of the key.

This invention relates to the type of lock and key in which impediments to prevent unauthorised operation of the deadbolt or locking bolt are situated within the casing of the lock and are capable of operation to enable movement of the deadbolt or locking bolt from the outward and locked position to the inward and unlocked position by a predetermined key when said key is entered from either side, in or through a keyhole in a barrel, curtain or deadbolt operating member and rotated.

Heretofore in locks of this type the impediments comprising pivoted or pivotless levers and tumblers, sliders, disc or sliding tumblers, pin-tumblers, wafers and the like—are, of necessity, positioned in a symmetrical order within the depth of the lock casing to ensure that co-operating notches in the key will give the correct amount of operational movement to each respective impediment to enable the deadbolt or locking bolt to be operated irrespective of the side of the lock from which the key is entered and rotated. The key has only one part, known as the bit, for rotation within the lock casing and it is in the bit that notches are provided. Therefore it is necessary to arrange the notches in a symmetrical order as to their depth and position to ensure their correct cooperation with the respective impediments according to the side of lock through which the key is inserted. This symmetrical arrangement of impediments in the lock casing and the corresponding arrangement of notches in the one key bit has the serious disadvantage of restricting the number of impediments on which different amounts of operational movements can be obtained to one half the number of impediments in the lock with the resultant restriction in different combinations, known as differs, thereby considerably reducing the security of the lock against unauthorised opening by the use of other means than that of a correct key.

It is known that locks and keys have been devised in which the need for the symmetrical arrangement of the impediments is eliminated by the use of a key having two bits, each bit having notches for co-operation with the impediments according to the side of the lock casing from which the key is entered so that while one bit is located within the lock casing the other bit is positioned outside the lock casing for rotation within a recess in the door. The keys for such locks are however necessarily of such length as to cause inconvenience in carrying.

The object of this invention is, therefore, to improve the security without restricting the use and application of locks of the type described, by providing means whereby the full differing potential is made available on all impediments irrespective of their position in order of operational movement when assembled in a lock casing having a depth or thickness acceptable for general use and application and whereby operation can be effected by a predetermined key of convenient and conventional length when entered from either side of the lock casing.

In a lock of the type described and according to the present invention a barrel or curtain is mounted for rotation in the lock casing to present a keyhole at each side of the casing, said keyhole being of such form to control the amount of entry of a key when inserted in the barrel from either side. Impediments to prevent unauthorised operation of the deadbolt or locking bolt are positioned in any order of operational movement to conform with the arrangement of notches in a predetermined key.

Referring to the accompanying drawings.

Figure 1:
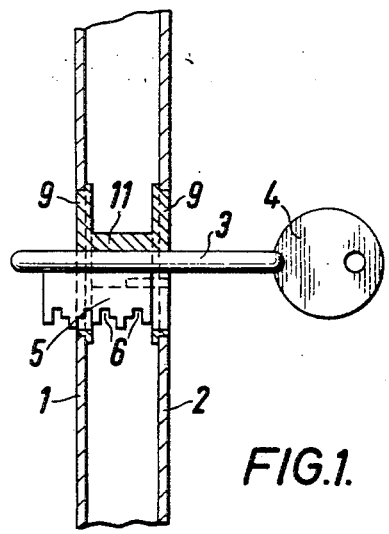
FIGURES 1 and 2 are fragmentary sectional views of a lock casing fitted with a barrel and key in accordance with the invention and showing the key inserted from opposite sides.
Figure 2:
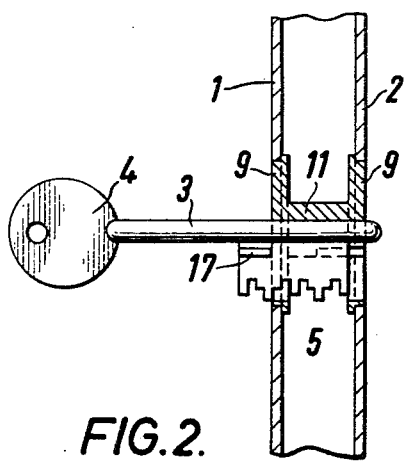

Referring in the first case to FIGURES 1 to 10, the lock casing is indicated by reference numeral 1 and the cover plate by reference numeral 2. The key includes a shank 3, a bow 4 and a bit 5, the latter having notches or steps 6 for co-operation with the impediments and deadbolt in the lock casing. As will be seen clearly in FIGURES 1 and 2, when the key is inserted from the right hand side as in FIGURE 1, one set of notches will be brought into use and when inserted from the left hand side as in FIGURE 2, the remaining notches will be brought into operation.

Figure 3:
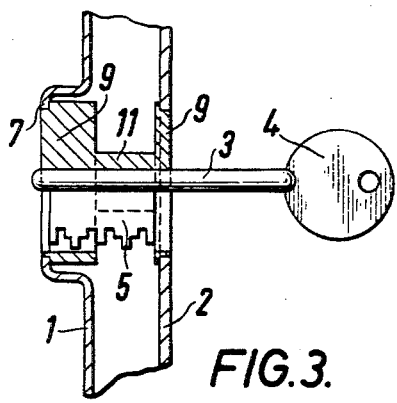
FIGURE 3 is a fragmentary sectional view illustrating another embodiment of the invention.
Figure 4:
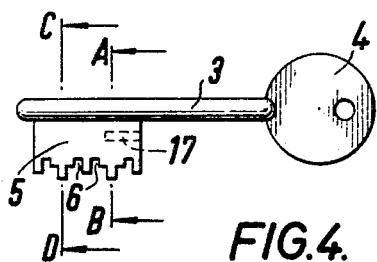
FIGURE 4 shows the key in side elevation.
Figures 5, 6:
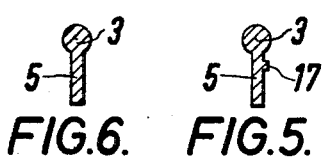
FIGURES 5 and 6 are sectional views on the lines A–B and C–D respectively in FIGURE 4.
Figure 7:
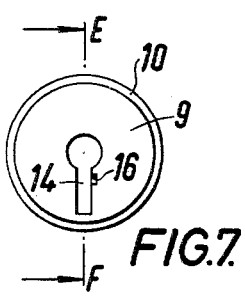
FIGURES 7 and 8 are end views showing the form of the keyholes in opposite ends of the barrel.
Figure 8:
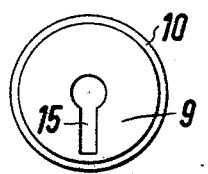

In FIGURE 1 part of the bit is shown projecting from the casing, the door being suitably recessed to allow of rotation of the key or as shown in FIGURE 3 the casing may be formed with or carry a hollow boss 7 in which the key can rotate.

In this construction of lock the casing 1 contains a barrel 8 into which the key enters, the construction of the barrel being clearly shown in FIGURES 7–10. The barrel 8 includes two spaced annular flange portions 9 which are recessed at the peripheries as at 10 to engage the edges of circular holes cut in the lock casing and cover plate. The flanges are joined by a cylindrical intermediate part 11 which has an axial boring 12 for the entry of the key shank and is formed with a radial slot 13 for the reception of the bit 5, the notches or steps 6 on the bit projecting through the slot to engage the impediments, the barrel being turned within the casing by turning movement of the key. The flange at the front of the casing is formed with a keyhole 15 whilst the flange associated with the cover plate has a keyhole 14. Keyhole 14 and one wall of the slot 13 is formed with a blind groove 16 for the entry of a longitudinal projection 17 on the bit 5. The length of the groove 16 is such tha as a result of the end of projection 17 engaging the end of the groove entry of the key from the right hand side of the casing will be limited as in FIGURE 1 and conversely when the key is inserted from the left hand side as in FIGURE 2, the end of projection 17 will abut against the adjacent flange. In this way alignment of the notches with the impediments will be assured irrespective of the direction of key entry. In FIGURE 3 one flange of the barrel is of increased thickness to fill the hollow boss 7.

Figures 9, 10:
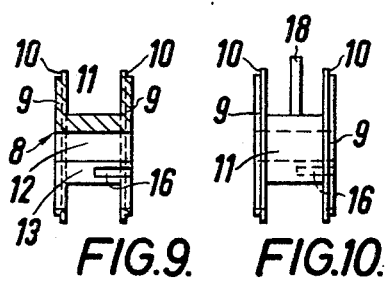
FIGURE 9 is a section on the line E–F in FIGURE 7.
FIGURE 10 is a side elevation of the barrel.

In FIGURE 10 the barrel is shown fitted with a radial arm 18 for operational or locking contact with the bolt. Suitable means may be provided for frictionally maintaining the barrel in a position for key insertion or withdrawal but this is not strictly necessary as both keyholes are exposed at all times to receive the key.

The arm 18 by engaging the deadbolt avoids the necessity for deadbolt steps on the key bit thus reducing the amount of projection of the bit outside the lock casing and correspondingly reducing the overall length of the key.

In FIGURES 11 to 20 the key shank is formed with a stepped collar portion having two adjacent increased diameter parts such as 19 and 20 providing between them a radial shoulder 21. The barrel has an axial boring 22 for entry of part 19 and with a larger diameter boring 23 for the entry of part 20, the two borings between them providing an intermediate shoulder 24 for engagement by shoulder 21 when the key is inserted as in FIGURE 11. When the key is inserted from the opposite side of the lock as in FIGURE 12, shoulder 21 abuts against the adjacent flange of the barrel to limit key entry.

Figure 12:
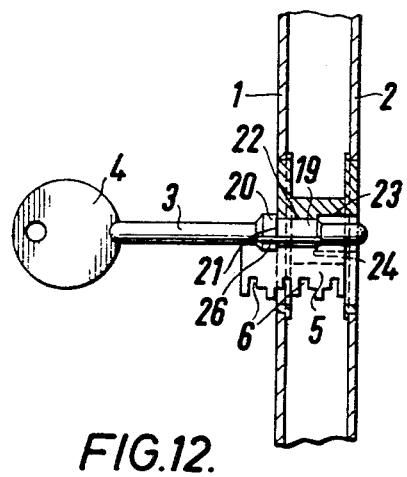
Figure 13:
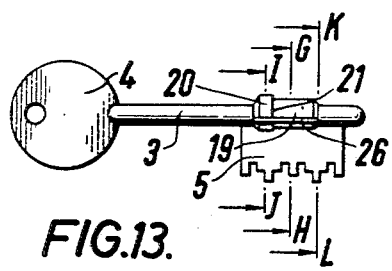
FIGURE 13 is a side elevation of the modified key.
Figure 14:
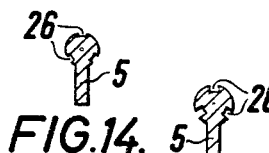
FIGURES 14, 15 and 16 are sections respectively on the lines G–H, I–J and K–L in FIGURE 13.
Figure 15:
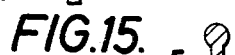
Figure 16:
Figure 17:
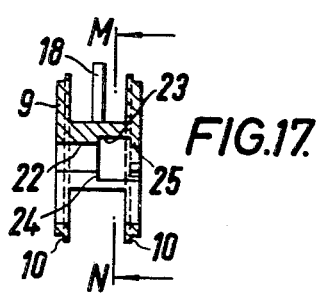
FIGURE 17 is a longitudinal section through the modified barrel.
Figure 18:
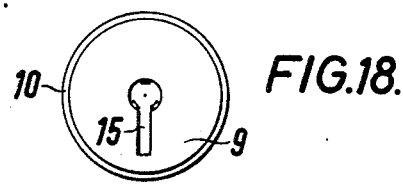
FIGURES 18 and 19 show the form of the keyholes in opposite ends of the barrel.
Figure 19:
Figure 20:
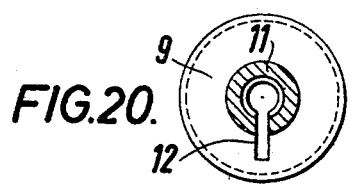
FIGURE 20 is a section on the line M–N in FIGURE 17.

To provide adequate bearing support for the extremity of the key when the latter is inserted from the left as in FIGURE 12, keyhole 14 as shown in FIGURE 19 is formed with inwardly directed radial projections 25, the inner ends of which provide a bearing hole for the end of the key shank.

Figure 11:
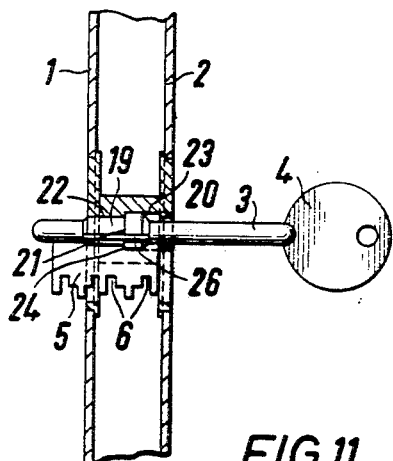
FIGURES 11 and 12 are fragmentary sectional views of a lock casing incorporating a modified barrel and key, the key being shown inserted from opposite ends.

To allow the key to be inserted from the right hand side as in FIGURE 11, parts 19 and 20 are formed with radial grooves 26 for the entry of lands or projections 25.

The key as hereinbefore described is of little more than normal length and is adequately supported at both ends when in position in the lock casing.

I claim:
1. In an improved lock and key, the combination comprising, a rotary locking barrel formed with a keyhole at each end thereof for entry of a key from either side of the barrel, a key, said key having an elongated bit and dual sets of lock actuating means and further including first means on said key cooperating with means on the barrel to permit entry of the bit of the key into and through the barrel from one side thereof, said first named means cooperating with the opposite side of the barrel to restrict the entry of the key bit into the barrel to a lesser extent for actuation of the lock upon insertion from the other side thereof.

2. In an improved lock and key as claimed in claim 1, wherein the barrel includes a cylindrical body having a radial key receiving slot and diametrically opposed keyhole flanges, the bit lock actuating means carried by said key arranged to extend beyond said radial slot in said barrel.

3. In an improved lock and key as claimed in claim 1, wherein at least one portion of the barrel is constructed with a longitudinally extending blind groove arranged to cooperate with the first named means carried by said key.

4. In an improved lock and key as claimed in claim 1, wherein the key includes an elongated shank portion, said shank portion having a stepped collar portion and the barrel including a complementally stepped bore.

5. In an improved lock and key as claimed in claim 4, wherein the stepped collar includes radially arranged grooves and the barrel is provided with complementally formed lands to be received in said grooves.

6. In an improved lock and key as claimed in claim 2, wherein the diametrically opposed flanges are arranged to be supported in a casing, said casing including a locking mechanism and a deadbolt means.

7. In an improved lock and key as claimed in claim 6, wherein the barrel is provided with radially extending means to actuate said deadbolt.

References Cited

UNITED STATES PATENTS

| 450,341 | 4/1891 | Russell | 70—364 |
| 962,287 | 6/1910 | Zinninger | 70—150 |
| 1,074,418 | 9/1913 | Doughty | 70—453 |

FOREIGN PATENTS

| 669,637 | 12/1938 | Germany. |
| 769,157 | 6/1934 | France. |

MARVIN A. CHAMPION, Primary Examiner

R. L. WOLFE, Assistant Examiner

U.S. Cl. X.R.

70—453